Dec. 21, 1937.  F. R. WEYMOUTH  2,102,817
FUSELAGE CONSTRUCTION
Filed April 4, 1935

INVENTOR.
FREDERICK R. WEYMOUTH.
BY
ATTORNEYS.

Patented Dec. 21, 1937

2,102,817

UNITED STATES PATENT OFFICE 2,102,817

FUSELAGE CONSTRUCTION

Frederick R. Weymouth, Buffalo, N. Y., assignor, by mesne assignments, to Curtiss-Wright Corporation, a corporation of New York Application April 4, 1935, Serial No. 14,550

5 Claims. (Cl. 244—119)

This invention relates to aircraft, and more particularly to metal fuselage construction therefor.

The invention pertains particularly to improved methods and means for constructing fuselages known as the metal monocoque type, wherein a sheet metal skin is applied to a skeleton structural framework.

A principal object of the invention is to provide a sectional fuselage structure wherein components, such as the two sides, top and bottom may be separately completely fabricated as sub-assemblies, to be later assembled together.

A further object is to arrange the bracing in the sub-assemblies to assume most efficiently the loads to which they are subject; for instance, the top and bottom assemblies are braced primarily for tensile and compressive loads, and the side assemblies are braced primarily for shear loads, thus producing, in effect, a sort of box beam. It is realized, however, that all sub-assemblies in the fuselage are subject in some degree to both tensile, compressive and shear loads; the bracing is arranged as above stated to better assume the greatest loads of a certain character in the most efficient manner.

Additional objects of the invention are to provide a novel form of skin-contacting structural member; to provide novel means for joining together the fuselage sub-assemblies; to provide a plurality of sub-assemblies some of which may be finally assembled to provide a partial fuselage shell within which other aircraft components may be readily assembled, after which the final fuselage sub-assemblies may be assembled to the balance of the structure; and to provide a sectional structure, parts of which may be removed for repair or replacement in case of damage without the necessity of replacing the whole unit.

Hereinafter, one embodiment of the invention will be described in connection with the annexed drawing, to more clearly illustrate the principles of the invention. In the drawing, similar numbers indicate similar parts.

Figure 1:
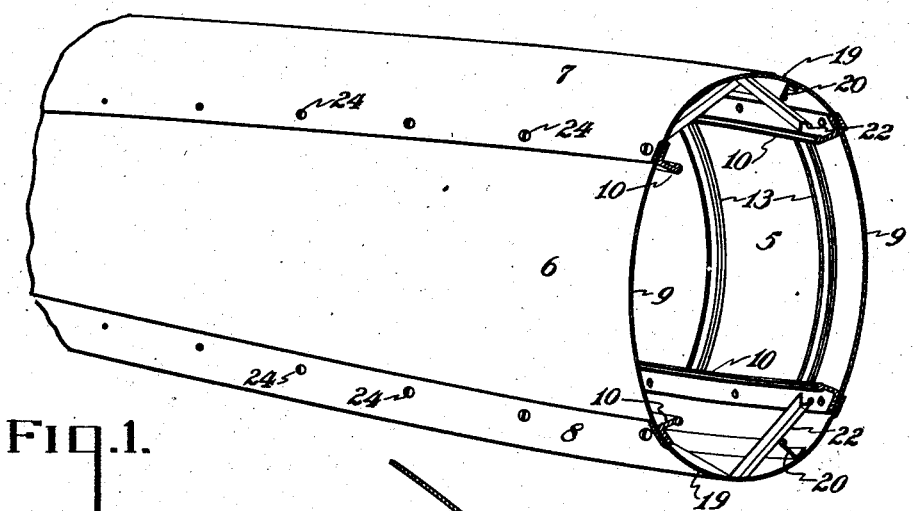
Fig. 1 is a perspective view of a portion of an aircraft fuselage constructed according to the principles of the invention.
Figure 2:
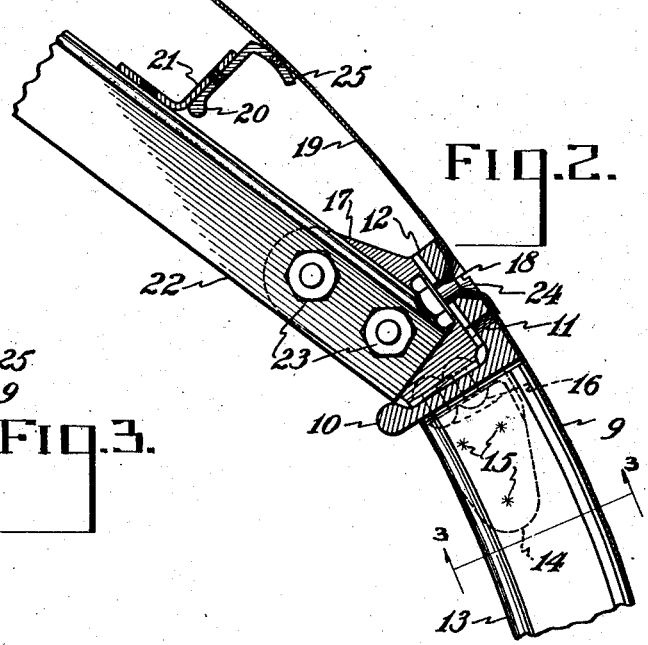
Fig. 2 is an enlarged section through part of the fuselage.
Figure 3:
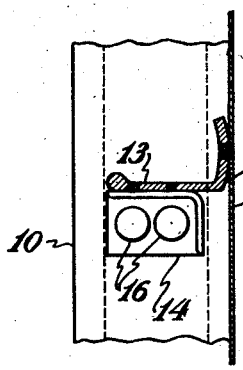
Fig. 3 is a section on the line 3—3 of Fig. 2.
Figure 4:
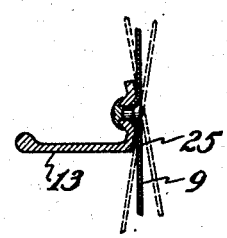
Fig. 4 is a section through a portion of the skin and an attached bracing element.

The fuselage comprises side sections 5 and 6, laterally spaced from one another, a top section 7 joined at its lateral edges to the upper edges of the side sections, and a bottom section 8 joined at its lateral edges to the lower edges of the side sections. Each side section 5 and 6 comprises a segmentally formed skin 9 fixedly attached at its upper and lower edges to longérons 10, these in the preferred embodiment taking the form of bulb angles, the skin 9 being spot-welded or riveted as at 11 to the straight flange 12 of the bulb angle. Between the longérons 10, and adjacent the skin 9, curved transverse braces 13 are attached in axially spaced relation along the fuselage, the braces 13 being of special bulb angle cross-section to be fully described later. A fitting 14 is riveted or welded as at 15 to each end of each brace 13, the fitting in turn being riveted as at 16 to the bulb flange of the longérons 10. A fitting 17 is attached to the other side of the longérons 10, being held thereto by the rivets 16 and by additional means, if desirable. The skin 9 is preferably attached to the braces 13 at a plurality of points, by spot welding, as shown in Fig. 3, or by riveting as shown in Fig. 4. The side panels 5 and 6 described above in detail, may be fabricated on jigs as complete sub-assemblies, the straight flanges 12 of the longérons being drilled and countersunk as at 18.

The top and bottom sections 7 and 8 are substantially the same, being separately fabricated in jigs as were the side sections. Each top and bottom section 7 and 8 comprises a segmental skin 19 of thin sheet metal to which are attached longitudinally thereof, and circumferentially spaced from one another, a plurality of stringers 20, these stringers 20 being of bulb angle cross section of substantially the same form as the braces 13. The bulb flanges of the stringers carry longitudinally spaced angle plates 21 to which transverse formers 22 are attached, the formers extending toward the lateral edges of the skin 19.

The sides 5 and 6 may then be assembled to the bottom section 8, the ends of the formers 22 engaging parts of the fittings 17, said ends then being bolted to the fittings by bolts 23. The skin 19 overlies the side skin 9 and the longéron flange 12. The assembler then drills the skin 19, piloting the drill from within in the holes 18, whereafter the sheets 19 and 9 are pressed into the countersunk portions of the holes 18 and flat head screws 24 are applied.

The interior fuselage equipment, not shown, may be installed after which the top section 7 is assembled in the same manner as was the bottom section 8.

The resultant fuselage presents a smooth outer contour of circular or elliptical cross-section, as preferred. The number of sections may be multiplied, if desired. The longérons, it will be noted, are generally, polygonally arranged, the sections having transverse shear bracing (13) alternating with sections having longitudinal tension and compression bracing (20).

The bulb angles forming the members 13 and 20 comprise skin contacting flanges 25 of arcuate cross section, the arc thereof having a radius of curvature somewhat smaller than the smallest radius to which the skin might normally be curved either in assembly or in stressed operation. This curved skin contacting surface 25 presents two advantages. One is, that the skin has a rather wide range of angularity in its potential contact with the brace member, as shown in Fig. 4, without tendency to bend at a corner. The fastening means, such as spot weld or rivet, may be applied on the line of contact of the two elements without danger of wrinkling the skin. The second advantage is, that since the skin is stressed in flight by both structural stress and air pressure, it may tend to deform and fold slightly around the structural member. If this occurs, the skin may not be sharply bent due to the arcuity of the face 25, but rather, must assume, in small degree, the local arcuate form of the face 25.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In fuselage construction, top and bottom panels each comprising metallic skin sections braced by continuous longitudinal stringers arranged for the assumption of tensile and compressive loads, side panels each comprising metallic skin sections braced by circumferentially disposed members and continuous longérons, the said members being attached at their ends to the said longérons, and arranged for the assumption of shear loads, transverse formers attached at one end of each to the skin of the top and bottom panels, attached intermediate their ends to the said stringers by which they are spaced from the said skin and having assembly connections at their other ends, and means adapted to separably attach one of the said longérons, stringer assembly connection and the skin sections of each two adjacent panels.

2. In monocoque fuselage construction, a joint adapted for the connection of two unit fuselage panels, one of the said panels comprising a skin section braced circumferentialy and adapted to assume principally shear loads, the other of said panels comprising a skin section braced longitudinally by continuous stringers and transversely by formers provided with apertures at one end and forming with a similarly provided adjacent edge of the said skin section a half of the said joint, the second said panel adapted principally to assume compressive and tensile loads, the first said panel provided with a longéron attached to the said skin section and circumferential bracing, having an attached bracket fitting and adapted to form therewith a second half of the said joint, apertures in the said bracket fitting adapted to aline with those of one of the said formers, apertures in the edges of both said skin sections and the said longéron, and fastening means adapted to engage the said apertures in assembled relationship of the two panels.

3. A metal fuselage construction comprising a plurality of separable sub-assemblies; two said sub-assemblies comprising side panels each having an upper and a lower longéron, vertical brace members fixedly attached at their ends to said longérons and a covering fixedly attached to said longérons and braces; two said sub-assemblies comprising respectively a top and bottom panel each having a curved covering, transverse formers, and continuous longitudinal stringers fixed to said covering intermediate the edges thereof; connection means associated with the said top and bottom longérons adapted for the separable attachment of the terminals of the said formers adjacent the lateral edges of the said top and bottom panels respectively, the lateral edges of the covering of the said top and bottom panels being overlapped adjacent said longérons; and means for the separable attachment of the said overlapped covering portions to the said longérons whereby a substantially continuous outer covering surface is obtained.

4. In sectional fuselage construction, a separable assembly joint for two adjacent fuselage sections; one said section comprising a longitudinal member, a curved skin covering having its longitudinal edge attached to said member and circumferentially disposed brace elements attached to said covering and to the said member; a second section comprising continuous longitudinal stringers, a curved skin covering and transverse formers, the said stringers being interposed between and attached to the said covering and formers; connection means associated with the said member adapted to be separably fastened to the said formers; the said skin coverings having overlapping portions adjacent the said member and means for separably fastening such portions thereto.

5. In sectional aircraft fuselage construction, a separable assembly joint for two adjacent fuselage sections; one said section comprising a longitudinal angle member, a curved skin covering having its longitudinal edge attached to a leg of said angle member and circumferentially disposed brace members attached to said covering and to another leg of the said angle member; a second section comprising longitudinal stringers, a curved skin covering and transverse formers, the said stringers being interposed between and attached to the said covering and formers; bracket means attached to both legs of said angle member adapted to be separably fastened to the said formers; the said skin coverings having overlapping portions adjacent the first said leg of the angle member and means for separably fastening such portions thereto.

FREDERICK R. WEYMOUTH.